United States Patent

Rainey

[11] Patent Number: 5,651,209
[45] Date of Patent: Jul. 29, 1997

[54] FISH ATTRACTOR

[76] Inventor: Don Rainey, 871 Tee St., Biloxi, Miss. 39532

[21] Appl. No.: 217,429

[22] Filed: Mar. 24, 1994

[51] Int. Cl.$^6$ .................... A01K 97/00; A01K 97/02
[52] U.S. Cl. .................. 43/17.5; 43/44.99; 362/34; 441/13
[58] Field of Search ................ 43/17.5, 17.6, 43/44.91, 42.06, 102, 44.99; 441/13, 20, 28; 362/34, 84, 182, 267, 186

[56] References Cited

U.S. PATENT DOCUMENTS

| | | | |
|---|---|---|---|
| 2,908,101 | 10/1959 | Butler et al. | 43/17.5 |
| 2,953,684 | 9/1960 | MacHutchin et al. | 362/84 X |
| 3,464,139 | 9/1969 | Eggers | 43/17.5 |
| 3,617,733 | 11/1971 | Adams | 43/17.5 X |
| 4,394,716 | 7/1983 | Campagna et al. | 362/158 |
| 4,635,166 | 1/1987 | Cameron | 362/34 |
| 5,133,145 | 7/1992 | McDonald | 43/17.5 |

*Primary Examiner*—Jeanne Elpel
*Attorney, Agent, or Firm*—Pravel, Hewitt, Kimball & Krieger

[57] ABSTRACT

A fish attractor in the form of a bottom dwelling or floating but anchored light including, optionally, a surface which provides for scintillating light effect as the device floats or moves in response to the waves. Optionally, the invention includes a fish, bait or scent dispenser for gradually dispensing a fish attracting chemical into the waters surrounding the light.

7 Claims, 3 Drawing Sheets

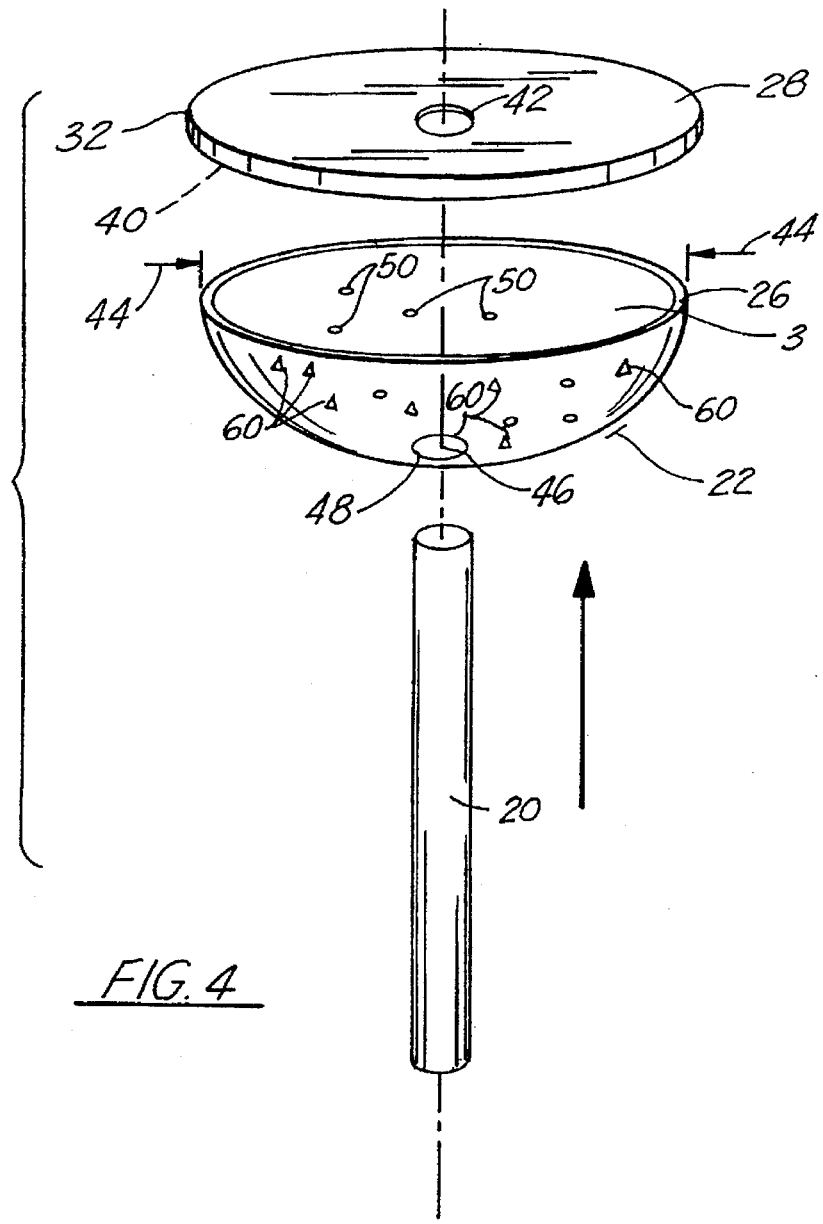
FIG. 4
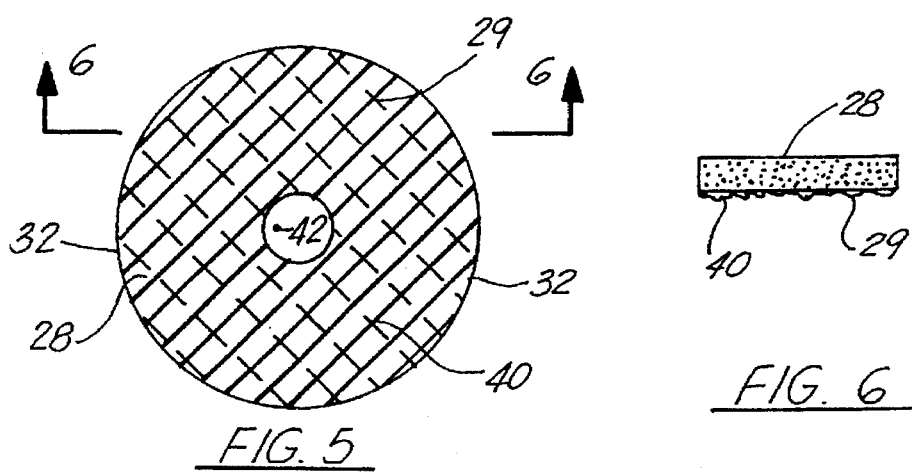
FIG. 5
FIG. 6

FISH ATTRACTOR

BACKGROUND OF THE INVENTION

This invention relates to attractors for fish for use by individual fishermen using cast lures and the like, or fishermen using cast nets.

Various devices are known for attracting fish into traps or onto lures. Such attractors, for instance, include the use of various forms of lights, including Day-Glo lights, embedded within a lure, or the use of various chemical scents or chum, or forms of food substitutes, all for the purpose of attracting a desired shrimp or fish to a location where they may be trapped or caught.

U.S. Pat. No. 2,908,993 to Webb discloses a bait trap with an internal electric light and a funnel entrance. The overall trap is of a solid transparent plastic.

In fishing, the use of combinations of light, scent and sound as a attractor is known. Patents include U.S. Pat. Nos. 3,680,245 to Brooks, 3,177,164 to Ewing, and 4,227,331 to Ursrey. U.S. Pat. No. 4,697,374 to Simms discloses the use of a blue green light with light pulsations to attract fish.

U.S. Pat. No. 4,638,584 to Lindsay discloses, in lures, the insertion of a chemi-luminescent capsule material to make the bait attractive. This patent also discloses the use of transparent patterns to simulate scales or other desired patterns in the body, implying the use of such a visual attractant on fish and similar predators.

U.S. Pat. No. 3,918,190 discloses the injection of a chemi-luminescent liquid to cause live bait to glow. In this patent it is also disclosed that separate chemi-luminescent capsules may be inserted within a preexisting bait. This patent specifically refers to the American Cyanamide Cyalume™ product.

U.S. Pat. No. 3,921,328 to Holcombe, and U.S. Pat. No. 4,610,103 to Steinman disclose a chemi-luminescent illumination of a lure.

Four patents to Mattison, U.S. Pat. Nos. 4,777,756; 4,751,788; 4,800,670 and 4,693,032 disclose various forms of adapting a lure to utilize a chemi-luminescent capsule or tube.

Each of the above patents teach the selection of illumination to attract the desired end fish to be caught, and imply that this requires a specific type and appearance of illumination.

SUMMARY OF THE INVENTION

The invention is a unique form of fish attractor in the form of a bottom dwelling or floating but anchored light including, optionally, a surface which provides for scintillating light effect as the device floats or moves in response to the waves. Optionally, the invention includes a fish, bait or scent dispenser for gradually dispensing a fish attracting chemical into the waters surrounding the light.

In use, the light is in the form of a floatable or a weighted, sinkable, light emitting dome of transparent material. The transparent material may additionally include metalization or varying translucent and transparent stripes so as to provide for a varying or a scintillating light as the angle to the dome changes with respect to the viewer. Within the dome is placed a source of light, preferably a chemi-luminescent chemical producing a low but steady yellow-green light. Alternate forms of light may include electrical lights.

The sinking apparatus is placed in shallow water areas on the bed of the fishing area shining upwards. The light and optional scents produce an attraction effect attracting fish, shrimp or the like. A cast net may then be deployed over the area illuminated by the light, increasing the catch at night. The apparatus is formed in a smooth domed shape; once placed on the seabed, it is not captured in the net and, therefore, a cast net can be repeatedly used in the vicinity of the light so long as it is desired to fish. Alternatively, fishing by means of lures or line fishing may be performed in the vicinity of the area illuminated by the light. A retrieval line or anchor line is attached to the apparatus to retrieve the apparatus after fishing.

In a second use, the floating apparatus may be anchored in deeper water by a line and will freely float on the surface of the water. In this form, the apparatus will toss and bob as the surface waves affect it. By embedding particles of metal in the dome material or by backing the dome with a reflective surface, this motion produces a fluttering or scintillating light which is of unusual effectiveness in attracting fish and shrimp to the vicinity of the apparatus. Net casting or trolling may be done under the light or standard line fishing may be accomplished.

It is, thus, an object of the invention to disclose a fish attractor which can be used in conjunction with, but physically apart from, a standard casting lure or bait fishing apparatus or a cast net for the capture of fish, shrimp and the like at night.

It is a further object of the invention to show a form of fish attractor which uses and develops a scintillating light effect for the more effective attraction of fish.

It is a further object of the invention to show a form of fish attractor which is of particular utility in attracting fish to an area for individual cast net fishing at night.

It is a further object of the invention to show a fish attractor which is of particular utility for attracting fish to an area for standard bait casting, fly fishing and the like by an individual fisherman.

This and other objects of the invention may be more clearly seen from the detailed description of the preferred embodiment which follows.

BRIEF DESCRIPTION OF THE FIGURES

FIG. 4 is an exploded view of the third embodiment of the invention.

FIG. 5 is a view of the reflective face of the float of the invention.

FIG. 6 is a section view of the float of the invention, showing an irregular reflective surface.

DETAILED DESCRIPTION OF THE INVENTION

Figure 1:
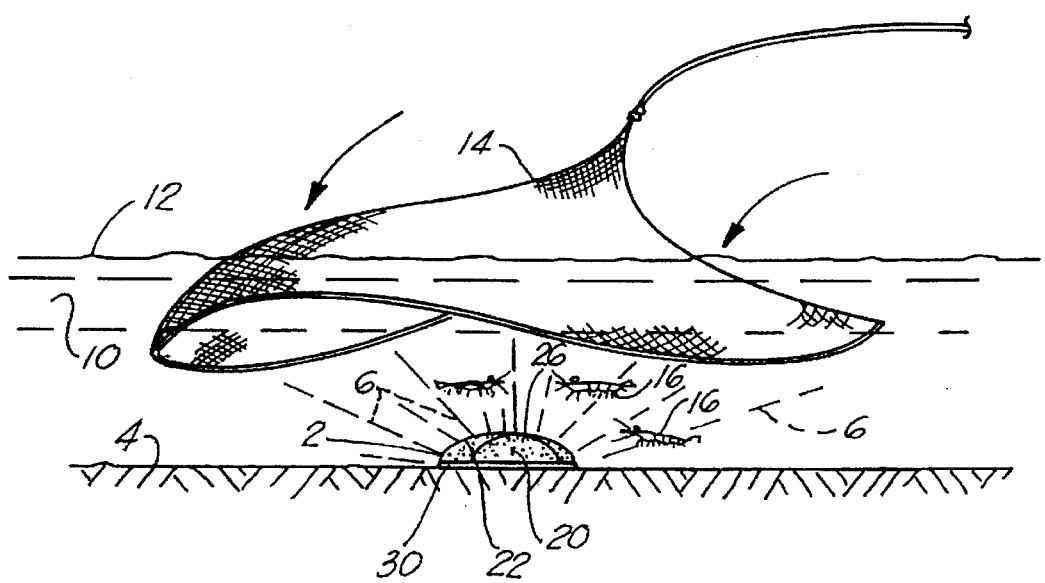
FIG. 1 depicts the apparatus of the invention used with a cast net.
Figure 2:
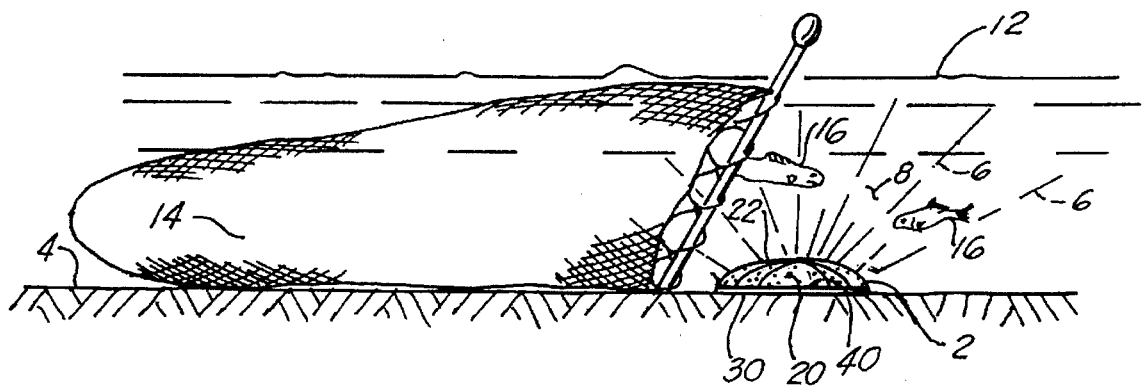
FIG. 2 depicts the apparatus of the invention used with a trawled net.

Referring to the drawings, I show three embodiments of the invention. The first is a bottom dwelling fish attractor 2 shown resting on a seabed 4 of relatively shallow depth so that illumination 6 from the attractor provides a fish attraction 8 throughout a column of water 10 rising to the surface 12. As discussed below, such an embodiment has particular utility in regards to use with cast nets 14 and similar methods of fishing for shrimp, small fish or game fish 16. The second embodiment is a floating embodiment 18, floating along the surface 12 of the water, providing illumination 6 fish attraction 8 down from the upper surface 12 of the water to a depth within the water 10. This embodiment is of particular utility in attracting fish 16 to an area for fishing with cast lines, baits and lures.

The first embodiment comprises a light source 20 within a closed transparent container 3. A light emitting surface 22 on this container 3 should provide a wide angle 24 of light dispersion. This can be accomplished with a relatively flat surface using a fresnel lens, but, in the preferred embodiment, is created by forming the surface of the light container 3 in the form of a dome 26. For ease of manufacture, this is a hemispherical dome 26, but any sufficient curvature producing a wide angle of light dispersion will suffice. The surface 22 of the dome is preferably transparent.

The light container 3 can be a sealed container having an opening for replacement of the light source 20. Such an opening may be a screw fit opening sealed with an O-ring or such an opening may be accomplished by forming the light container in the form of a removable base 28 with attachment to the light emitting surface 22. Alternatively, the container 3 is open to the water. Within the light container is provided a source 20 of illumination. While this can be battery operated illumination either in the form of battery operated incandescent bulbs or battery operated fluorescent bulbs, it has been found most effective to use any one of the standard chemo-luminescent light sticks 20 such as the Cyalume™ light which provides a smooth and relatively moderate yellow-green light which seems to have particular effectiveness in attracting fish and also in attracting plankton upon which fish and shrimp will feed.

In the bottom dwelling version of the attractor 2, the dome 26 is provided with weights 30 in its base 28 or around its outer periphery 32, the weights 30 being positioned so that the dome 22, when thrown or cast into the water will orient itself in a light emitting surface 22 up, weight 30 down position rather than the reverse. This is accomplished by forming the light containing dome 22 as a structure having buoyancy either from trapped air or from the natural buoyancy of the light source 20. For efficiency of manufacture these weights may be in the form of a uniform disk forming the back 28 of the dome. However, it can readily be seen that the weights 30 can be in the form of discreet weights 30 positioned periodically around the rim 32 of the dome so as to provide for a uniform balanced and downward motion. Two or three such weights would be sufficient.

It is additionally advantageous for a bottom cast attractor 2 to provide a tether line 34 with float 36 so that the light 2 can be readily retrieved from the bottom. Alternatively, the dome of the apparatus may be partially filled with a fish bait or scent 51, which will gradually flow out into the water. The fish bait or scent 51 can serve at the weight which sinks the attractor; in such a case, depletion of the fish bait 51 through dispersion will cause the attractor to float to the surface for easy retrieval.

The dome 22 provides a smooth, non-catching surface when placed upon the bottom and an uniform illumination 6 throughout a region of water. This is particularly advantageous in attracting fish or shrimp 16 to an area where they can be readily captured by known techniques of cast net 14 casting. As is known, a cast net 14 when retrieved drags across the bottom surface 4 of the water in which it is cast.

By providing the bottom dwelling fish attractor 2 in the form of a dome 22 backed by a smooth annular weight, there are no surfaces on the attractor 2 which can cast or trap the net 14, and the net 14 will smoothly pass across the attractor 2. Thus, the attractor 2 remains in place and the cast net 14 can be repeatedly used in the vicinity of the attractor 2 for effective and efficient fish or shrimp capture.

In a second embodiment, the back 28 is made buoyant rather than weighted so that the assembly 2 floats, hanging dome 22 down. In this embodiment, the buoyancy of the back 28 is made greater than the buoyancy of the light dome 22 so that the proper orientation of the light in the water is assured to illuminate the water underneath the device. In this embodiment, and also in the bottom dwelling embodiment, it is advantageous that the rear 40 of the light dome be reflective so as to maximize the light actually projected into the water region around the attractor.

A third embodiment of the invention is constructed of a disk-shaped back float 28, preferably made of an aluminized or reflective coated foam disk, such as a styrofoam disk coated with aluminum foil 29. A hole 42 is pierced or formed in the center of the disk 28, slightly smaller than the diameter of a standard Cyalume™ or similar chemical light stick 20 of the kind which starts to glow when crushed or bent. A suitable such device is made by Coghlan's, Ltd. of Winnipeg, Canada, and consists of a crushable plastic stick approximately one-half inch in diameter by about five inches long.

A transparent plastic dome 22 having an outer diameter 44 sized to fit the float disk 28 is provided. In the center 46 of the dome 22 is a flexible hole 48 of a size adapted to snugly fit around the light stick 20. A periodic array of small holes 50 is formed in the dome 22 so that water may freely enter and flush out of the dome 22.

This form of the floating light 2 is assembled by inserting the light stick 20 through the hole 42 in the floating disk and through the dome 48. As an option, loose bait, scent or fish food 51 may be inserted into the dome 22. The dome 22 is then slid along the light stick 20; friction on the light stick 20 causes the dome 22 and the reflective float 28 to adhere together. The light stick 20 is crushed to initiate the chemical light. The assembly 2 then floats in the water, light stick 20 down. The aluminum reflective surface 29 on the float 28 reflects the light 6 through the dome 22 into the water. It is advantageous if the aluminum reflective surface 29 is crinkled or irregular so as to provide a scintillating light effect. This produces the same effect as embedding metallic particles 60 in the transparent dome 22.

Normal wave action, in tossing the dome 20 and the light 20, causes both a scintillation in the light and, in addition, causes a flow of water through the holes 50 carrying the chemical attractor or the bait 51 out through the holes 50 and further attracting fish 16. The entire device, therefore, provides in this third embodiment, a handy, floatable, and easily disposable one-time attractor light for use by fishermen at night as a top floating light to attract fish either for bait, line or net fishing.

A particularly effective variation on the floating fish attractor provides for the presence of small metallic reflective particles 60 within the translucent dome 22. Alternatively, small areas of greater or lesser transparency can be provided within an overall translucent dome. The effect of such a structure is that the light will appear to scintillate or sparkle within the water as the normal wave action of the water causes the dome to pitch and toss when floating. This increases the attractiveness of the light to fish or desired species such as shrimp.

Figure 3:
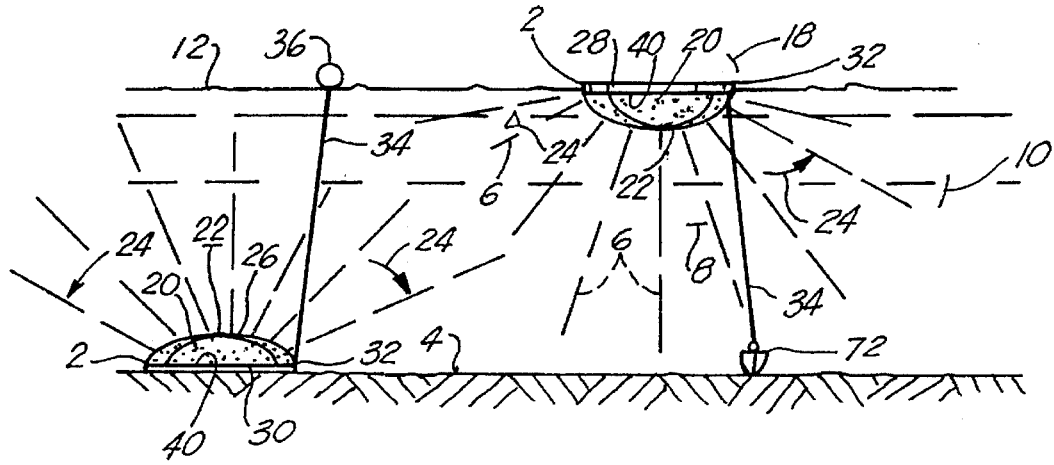
FIG. 3 depicts both the bottom dwelling and the floating embodiment of the invention.
Figure 7:
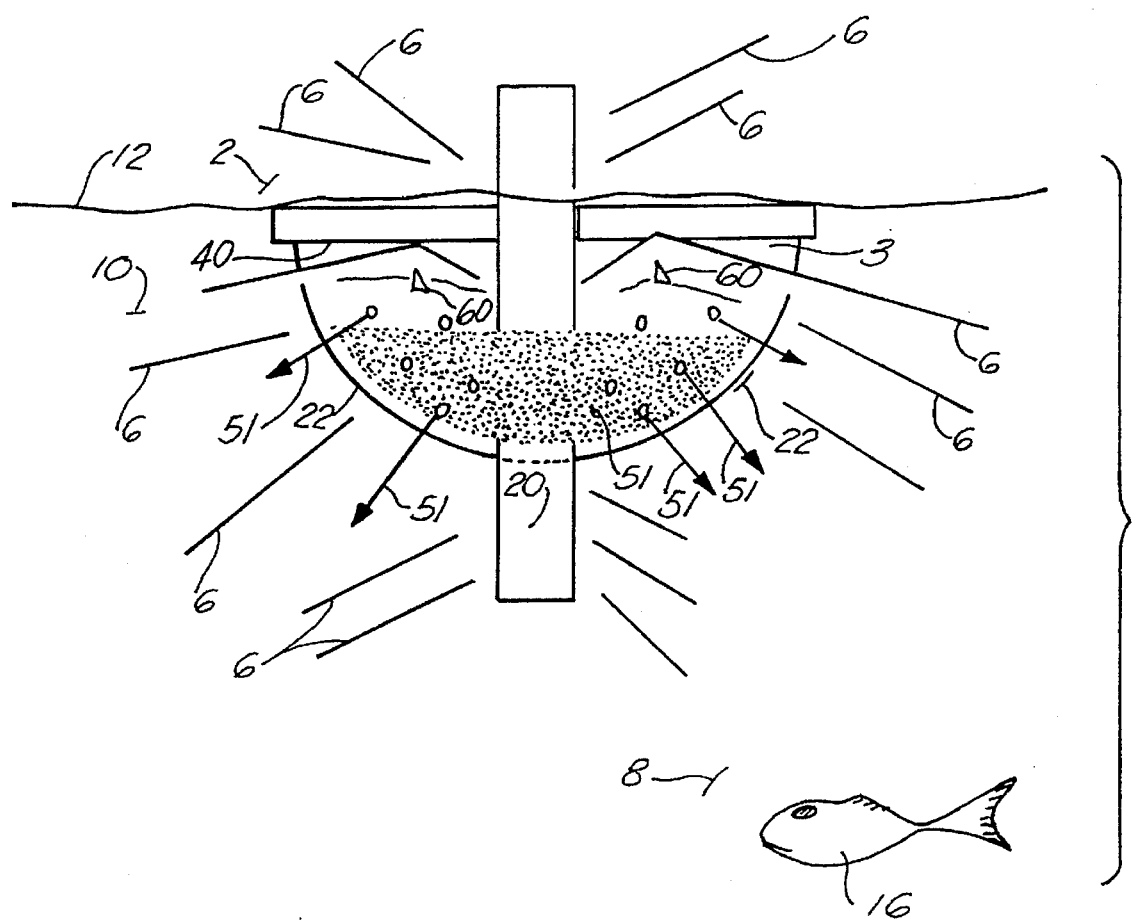
FIG. 7 is a view of the assembled third embodiment of the invention.

The dome can be provided with a tether 34. In FIG. 3, the tether 34 is shown attached to a bottom anchor 72 so as to moor the dome in a fixed place in water having currents. The tether 34 may also be attached to a pier, or a boat or to a wade fisherman. Likewise, a tether 34 may be attached to the bottom dwelling attractor, and held by a float 36, to permit easy retrieval. A series of tethers 34 may be connected to form a line or string of fish attractors 2.

The floating version of the dome is of particular effectiveness in attracting fish to near the surface of the water or in use in water to deep for a bottom dome where bait casting or line fishing, such as with lures, baited hooks or the like, is practiced.

It should be apparent that there are other uses and modes of employment for the invention beyond the embodiments discussed. The preferred light is a chemical light producing a yellow green light. However, the disclosed invention includes electrically operated lights, and it is felt that an ultra violet battery operated light would have advantages for attracting some species of shrimp or fish, especially at night.

The third embodiment of the light requires that part of the light stick protrude above the float, to hold the assembly together; the light from this tip can serve to mark the location of the apparatus at night.

While the disclosure mentions cast nets, as a typical fishing use, the apparatus also is advantageous when used with butterfly nets or seine nets. A line of the dome lights can be deployed as floats, and a boat drawn net or trawl can then pass along the line, with improved catches resulting.

It can thus be seen that the invention comprises a uniform light emitting structure comprising a translucent or partially transparent light emitting surface having a wide angle of dispersal in a container containing a source of illumination which can be replaced periodically. The container is supported by either weights or floats, so as to float the light emitting surface down or to descend through the water to rest on the bottom with the light emitting surface up.

In addition to the light emitting attractor, provisions may be made around the attractor surface 22 for the dispersal of quantities of fish attracting scent, chum or the like for the purposes of additionally attracting fish to the vicinity of the fish attractor. Such a structure can comprise periodic holes open to the water, with the attracting bait placed in the dome and which, through diffusion into the water, will gradually emit the desirable scent or attractor into the water in the vicinity of the illuminated area.

It can thus be seen that the invention provides for a handy portable fish attractor which can readily placed by a fisherman doing night fishing either by means of cast nets or by means of fishing lines, lures and the like. The fisherman can place the item preferentially on the bottom for cast net work or float the article so as to bring the fish close the surface for line casting and bait fishing. The article thus has considerable utility for all forms of individual line fishing and extends beyond the preferred embodiment described to that wider range of embodiments as are inherent.

I claim:

1. An apparatus for attracting fish to a location comprising:

a disc shaped float having a central opening therein;

a transparent dome, having a central opening therein;

a light stick extending through said float central opening then through said dome central opening, fastening together said float and said dome.

2. The apparatus of claim 1 further comprising:

a reflective surface on said float for reflecting light through said dome.

3. The apparatus of claim 2 said reflective surface having a crinkled or irregular surface.

4. The apparatus of claim 1, further comprising:

said dome containing a plurality of openings: and a particulate fish bait or scent inserted within said dome.

5. The apparatus of claim 4 further comprising:

a reflective surface on said float for reflecting light through said dome.

6. The apparatus of claim 5 said reflective surface having a crinkled or irregular surface.

7. The apparatus of claim 5 further comprising:

reflective particles embedded in said dome.

* * * * *